US005239858A

United States Patent [19]

Rogers et al.

[11] Patent Number: 5,239,858

[45] Date of Patent: Aug. 31, 1993

[54] METHOD AND APPARATUS FOR THE AUTOMATED TESTING OF VEHICLE FUEL EVAPORATION CONTROL SYSTEMS

[75] Inventors: John N. Rogers; George Timmerman, both of Tucson, Ariz.

[73] Assignee: Environmental Systems Products, Inc., East Granby, Conn.

[21] Appl. No.: 839,318

[22] Filed: Feb. 20, 1992

[51] Int. Cl.[5] .............. G01M 3/20

[52] U.S. Cl. .............. 73/40.7; 73/118.1; 123/518

[58] Field of Search .............. 73/40.7, 49.7, 118.1; 123/518, 519, 520

[56] References Cited

U.S. PATENT DOCUMENTS 4,794,790 1/1989 Margarit-Metaxa et al. ..... 73/118.1 X
5,146,902 9/1992 Cook et al. .............. 73/118.1 X
5,158,054 10/1992 Otsuka .............. 123/520 X

FOREIGN PATENT DOCUMENTS 2635823 3/1990 France .............. 123/518
663874 5/1979 U.S.S.R. .............. 73/49.7

*Primary Examiner*—Hezron E. Williams
*Assistant Examiner*—Joseph W. Roskos
*Attorney, Agent, or Firm*—Schweitzer Cornman & Gross

[57] ABSTRACT

A method and apparatus for the testing of a vehicle fuel evaporation control system, which typically includes a fuel tank, vapor adsorption canister and purge valve, consisting of the introduction of a non-reactive gas into the control system and the subsequent monitoring of the engine exhaust during operation for presence of the gas. The operating parameters of the engine may be varied to determine parameter-associated operation of the control system. In addition, the quantity of gas admitted into the system may be compared to that exiting the exhaust to provide a quantitative measurement of the integrity of the control system.

10 Claims, 2 Drawing Sheets

METHOD AND APPARATUS FOR THE AUTOMATED TESTING OF VEHICLE FUEL EVAPORATION CONTROL SYSTEMS

The present invention relates to a new and improved method for conducting a test of a vehicle fuel evaporation control system and an apparatus by which the methodology may be performed.

BACKGROUND OF THE INVENTION

The testing of the functional systems of automobiles, trucks and the like has progressed to the point that extremely sophisticated and detailed tests may be performed to insure both that the components of an automobile are working properly from a mechanical and electro-mechanical point of view, and that system performance is in accordance with mandated guidelines, whether they be on the federal, state or local level. The federal Environmental Protection Administration (EPA), for example, has promulgated extensive regulations limiting the emissions of motor vehicles. Typically, a battery of tests may be performed by a test technician utilizing a computer-controlled interface and analysis system which provides essentially real time evaluation of the parameters under test.

One area in which test technology has lagged, however, is in the analysis of the system and components utilized to control fuel evaporation to the atmosphere from the fuel tank and associated piping. Such loss of fuel is both wasteful and environmentally unsound, as the evaporated fuel, in addition to creating a possibly dangerous situation, contributes to unwanted hydrocarbon pollution. Indeed, the EPA has imposed requirements that vehicle fuel evaporation control systems be inspected for proper performance. Typically, however, such inspections have been conducted manually, without the benefit of automated test procedures which would simplify the inspection and provide more reliable and consistent testing.

It is accordingly a purpose of the present invention to provide a method and apparatus for testing the integrity of the fuel evaporation control system on a vehicle.

Yet a further purpose of the present invention is to provide such an apparatus and method which may be conducted in an automated, non-intrusive manner.

Still a further purpose of the present invention is to provide such a method and apparatus which may be incorporated into existing test systems and test routines.

Still another purpose of the present invention is to provide such a method and apparatus which can provide both qualitative and quantitative measurements relating to performance of the fuel evaporation control system.

BRIEF DESCRIPTION OF THE INVENTION

In accordance with the above and further purposes and features, the methodology of the present invention comprises the charging of the fuel system with an appropriate non-reactive gas, such as helium. In a preferred embodiment, charging of the system is continued until the air of the fuel system is fully purged and replaced with the inert gas. A test, may then be performed to confirm integrity of the control system's vapor collection canister. The engine is then started, at which time other tests relating to engine operation, typically automated, can be performed. During the period of such testing, or independently if desired, the vehicle exhaust is monitored for presence of the charging gas.

In particular, the engine operating conditions, such as load, speed and the like, may be varied during the monitoring process to confirm proper operation of the canister purge valve. The presence of the inert gas in the exhaust may be used to verify the integrity of the lines in the fuel evaporation control system and that the other components of the system operate properly. With use of a quantitative measuring device at the exhaust, coupled with a monitored injection of the gas, the amount of gas leaving the system through the exhaust may be compared to that entering the system. As the chosen gas is non-reactive, the difference in quantities reflect system losses such that a quantitative measurement of such losses can be determined. Such analyses may be performed concurrently with other automated emissions tests to provide a fully automated and complete analysis of vehicle system performance.

BRIEF DESCRIPTION OF THE DRAWINGS

A fuller understanding of the present invention and its specifications and features will be obtained upon consideration of the following detailed description of a preferred, but nonetheless illustrative embodiment of the invention when taken in conjunction with the annexed FIGS. 1A and B, which represent a schematic diagram of the apparatus for performing the present invention and which further outline the process thereof.

DISCLOSURE OF THE INVENTION

Figure 1A:
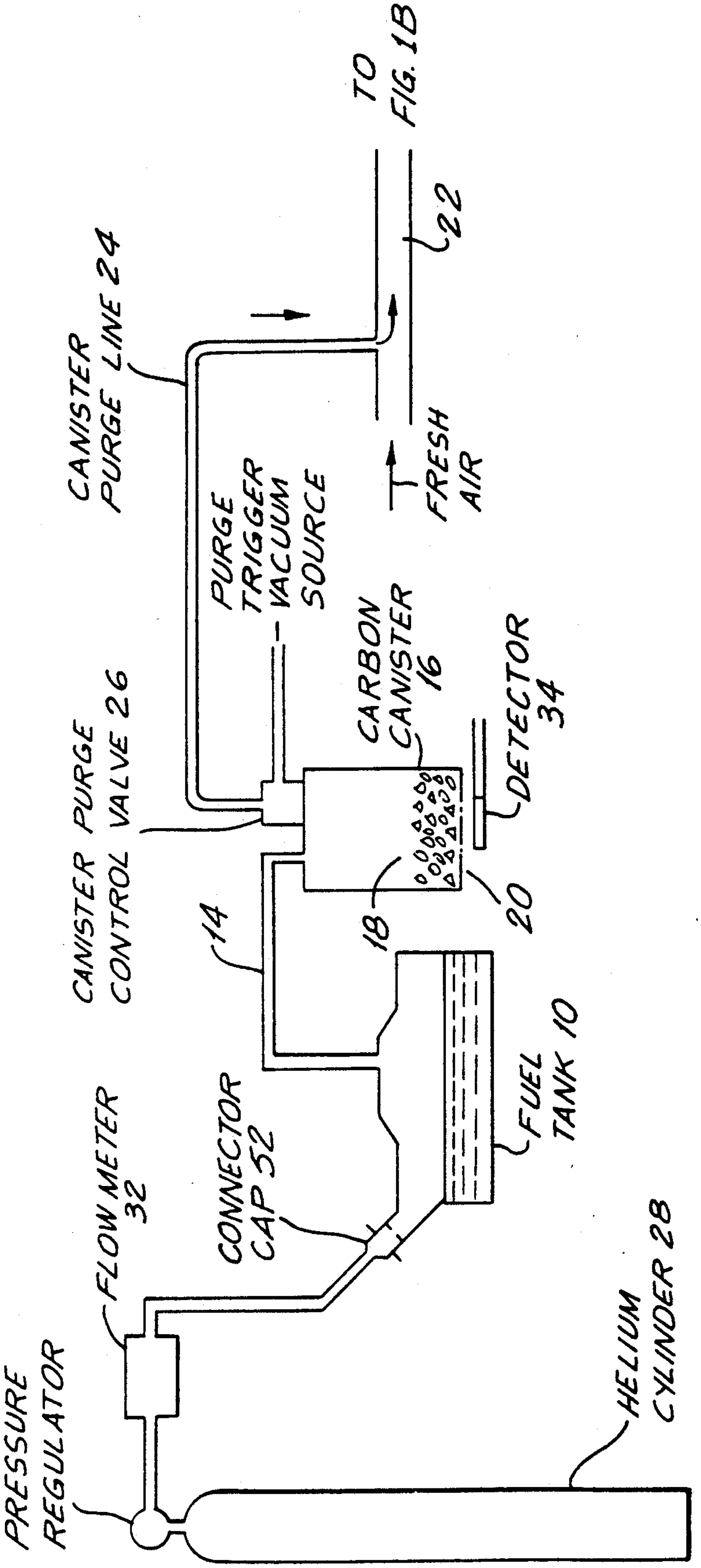
Figure 1B:
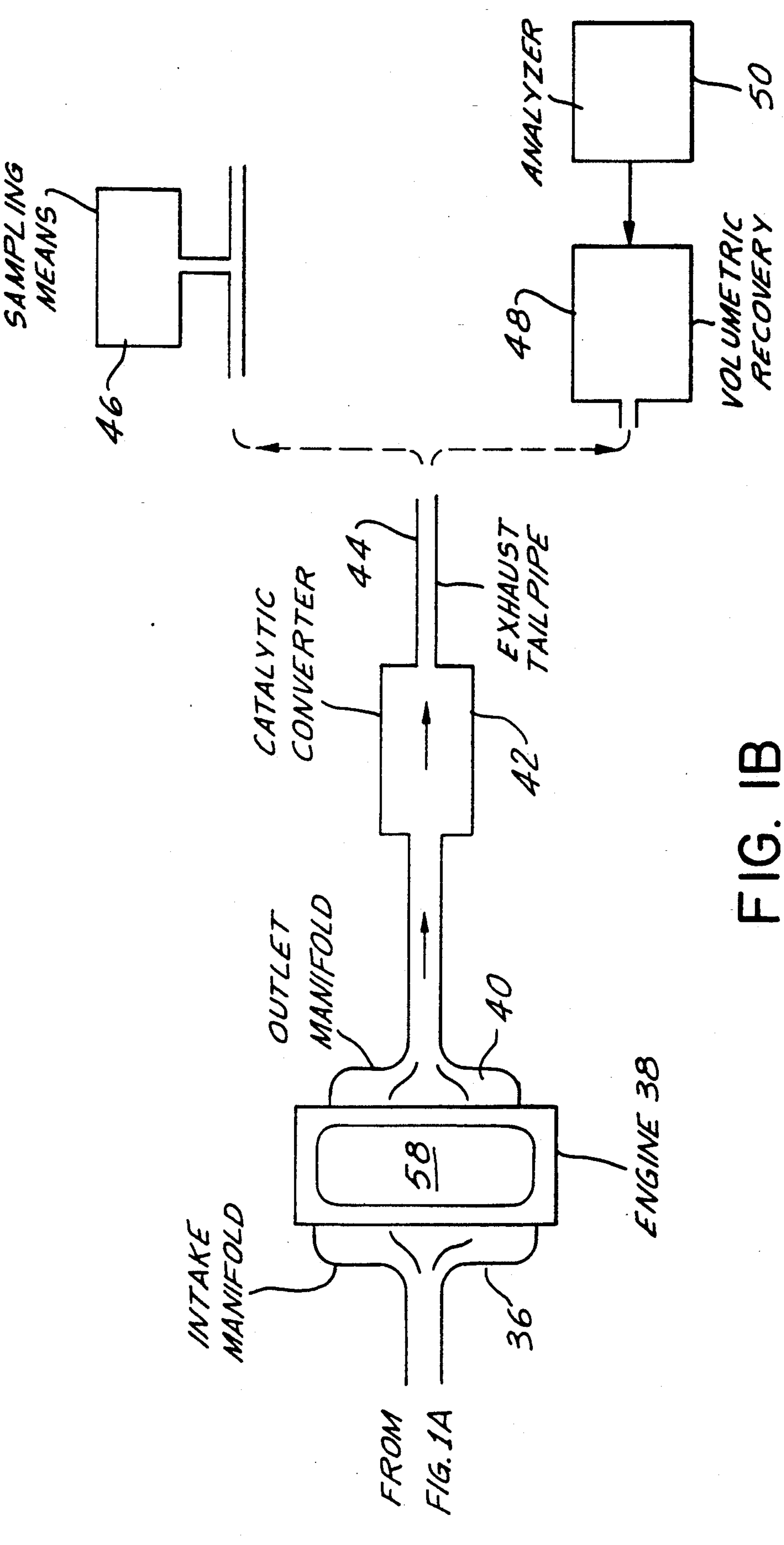

As shown in the Figures, the fuel evaporation system of a typical automobile includes the fuel tank 10 of generally conventional characteristics having a fuel inlet or filler line 12 capped by an appropriate removable filler cap or stopper (not shown). As gasoline and other hydrocarbon fuels are volatile, the space above the fuel in the gas tank 10 soon fills with fuel vapors, the extent of which are dependent on the fuel, temperature, and ambient pressure. As the temperature increases, for example, the extent and rate of evaporation increases, increasing the partial pressure of the evaporated fuel within the tank. To avoid excessive pressure being developed, the filler cap is typically provided with a pressure relief valve which allows the tank to be vented to the atmosphere in the event the pressure within the tank exceeds a pre-set level. Such venting lowers the pressure to a safe level, but releases the fuel vapors directly to the atmosphere.

To limit such venting, in addition to a fuel line (not shown) which is adapted to withdraw fuel for combustion in the cylinders, the fuel tank 10 is provided with a second line 14, typically located at the top of the tank, which leads to vapor collection canister 16. The canister 16 is provided with an adsorbent 18, typically activated charcoal, which adsorbs the fuel vapors. The canister may be constructed with a perforated bottom or with another venting means upon which the adsorbent rests which permits air (as opposed to fuel vapors) from the gas tank to vent to the atmosphere upon expansion and which further permits ambient air to be drawn into the canister, as will be explained subsequently. Egress of the fuel vapors through the open bottom, however, is prevented by the carbon granules 18 with which the vapors come in contact and are adsorbed upon within the canister. Thus, as pressure within the tank rises, it is controlled by the venting of fuel tank air to the atmosphere, while fuel vapors are prevented from escape. Such action typically obviates operation of the filler cap relief valve.

The canister 16 is connected to the engine air inlet line 22 by canister purge line 24, which is connected to the canister 16 typically through purge control valve 26. Valve 26 is typically controlled by a vacuum source produced by operation of the engine, such that valve 26 is not opened until the engine is running. The valve may be further configured such that it opens at a specific vacuum level corresponding to the engine attaining a pre-set speed. Alternatively, the valve may be exclusively driven, controlled by the vehicle's on-board computer system.

When the valve 26 opens, the pressure drop along air inlet 22 due to air flow to the engine is sufficient to draw the contents of the canister through valve 26 and purge line 24 into the line 22 where it blends with the fresh air in the line. Fresh air may be drawn into the canister 18 through its perforated bottom, mixing with the adsorbed gas vapors, which are drawn out of the canister. The blended gases in line 22 pass into the engine intake manifold 36 and are provided to the engine 38 for blending with fuel and combustion. Exhausted gases from the combustion process are collected in outlet or exhaust manifold 40, passed through catalytic converter 42, and are then released to the atmosphere through tail pipe 44. In such a manner the gasoline vapors are utilized, rather than being lost and vented to the atmosphere.

The present invention includes means to pressurize the fuel system in a non-reactive, environmentally sound manner. Towards that end, an appropriate gas, such as helium, is applied to the fuel system in a manner to displace the air therein. Accordingly, pressurized helium cylinder 28, having a pressure regulator 30 and a flow meter 32, is connected to the fuel filler line 12 by use of a cap 52 compatible with the cap lock located on the filler line to provide an air tight connection therewith. While the present disclosure suggests the use of the noble gas helium as the charging gas, it is to be recognized that other gases or combination of gases may be utilized in place of helium, so long as they are non-reactive with gasoline, are not adsorbed onto the carbon granules 18 in the canister 16, are non-reactive during combustion of the air fuel mixture in the engine cylinders, and are not affected by passage through the catalytic converter 42. Such gases, for purposes of the present disclosure, shall be characterized as "inert". It is expected that at least other noble gases will be appropriate for use in connection herewith.

The procedure of the present invention provides that the helium is introduced into the fuel tank, wherein it blends with the air therein and flows into the carbon canister 20. As the canister purge control valve 26 is closed, the pressure being built up in the fuel tank and associated piping by introduction of the helium is vented through the perforated bottom 20 of the canister. A detector 34 as know in the art may be placed proximate the perforated bottom of the canister to detect the outflow of helium and thus to confirm that the canister is properly connected to the fuel system and is not blocked. Helium introduction can continue for a sufficient period to fully purge the air from the fuel system.

After canister integrity has been confirmed the automobile engine may be started. At this time the test technician may perform other tests, such as engine and exhaust analysis, using known methods and technology.

With the engine started and running, purge control valve 26 opens, drawing the contents of the canister into the air inlet line 22 and subsequently into the intake manifold 36 of the engine. The pressure and flowrate of the helium source can be adjusted by regulator 30 in conjunction with monitoring of the detector 34 to assure that the flow of the contents of canister 16 to the engine equals or exceeds the introduction of helium into the system such that there is no longer any helium loss to the atmosphere through the bottom of the canister. It is to be recognized that the monitoring of the detector 34, along with control of the flowrate for the helium, can be performed in an automated manner by the test equipment using techniques well known in the art.

Because the helium or other chosen gas is inert and non-reactive to the processes in the engine, it passes through intake manifold 36, engine 38 and exhaust manifold 40, as well as catalytic convertor 42, without change. Thus, the mass of helium entering the system through filler line 12 equals the mass of helium exiting through the tailpipe 44. Any loss of mass represents leakage in the system, the extent of loss indicating the magnitude of the leak.

Accordingly, the present invention may utilize a variety of sampling techniques, each of which may be conducted at the tailpipe 44. In a first embodiment, qualitative sampling means 46 as known in the art are provided whereby the existence of helium in the exhaust verifies the integrity of the vapor lines in the fuel evaporation control and confirms that the canister has undergone purge. The timing of the first presence of helium in the exhaust as the speed of the engine is varied may be used to confirm that purge valve 26 operates at the proper speed. In such tests only a portion of the exhaust need be sampled.

In a second embodiment, the entire exhaust, or a precisely-determined portion thereof, may be captured by a volumetric recovery means 48. The concentration of helium in the exhaust is measured by quantitative analyzer 50, thus allowing the mass flow of helium from the exhaust to be determined. This value is compared with the helium flow into the fuel tank, providing a quantitative measure of the existence of leakage, if any. Alternatively, with the engine running in a steady-state condition whereby mass flow per unit time is constant, a controlled volume sampled over a controlled time may be sampled and compared to input flow over a corresponding time for leak analysis.

By the use of automated sampling detection and analysis techniques as know to the art, the flow meter sampling system and measurement system, may all be interfaced to known engine diagnostic systems and computers. This permits the sampling process to be automated and performed concurrently with other tests of the automobile.

We claim:

1. Apparatus for testing a vehicle fuel evaporation control system comprising a fuel tank, a fuel vapor collection canister and a canister purge control valve, the apparatus comprising an inert gas source, means for connecting said source to the automobile fuel evaporation control system under test, means for monitoring the flow of said inert gas into said fuel evaporation control system, means for determining the integrity of said canister by detection of the outflow of said inert gas from said canister, and monitoring means connected to the exhaust pipe of the automobile to determine the presence of said inert gas in the engine exhaust.

2. The apparatus of claim 1, wherein said inert gas is helium.

3. The apparatus of claim 2 wherein said inert gas flow monitoring means comprise means for determining the mass of inert gas entering said fuel evaporation control system and said exhaust monitoring means comprise means for determining the mass of helium passing through said exhaust.

4. The apparatus of claim 3 further comprising means for comparing the mass of inert gas entering said system to the mass of inert gas in said exhaust to determine the extent of leakage in said system.

5. The apparatus of claim 1 wherein said connecting means comprises a connector adapted to provide an entrance for said inert gas through the fuel inlet for said fuel tank.

6. A method for the automated testing of a vehicle fuel evaporation control system comprising a fuel storage tank, a fuel vapor collection canister and a canister purge control valve comprising the steps of:

i) connecting the fuel evaporation control system to a source of inert gas and introducing said inert gas into said system with the vehicle engine off;

ii) monitoring said canister for the presence of the inert gas therein;

iii) starting the automotive engine and running the engine in a manner to permit the canister purge control valve to open; and iv) monitoring the exhaust of said vehicle for the presence of said inert gas therein.

7. The method of claim 6, wherein said exhaust monitoring step comprises comparing the mass of inert gas exiting said tailpipe with the mass of inert gas entering said system, whereby leakage of the system may be determined.

8. The method of claim 6 wherein said engine starting and running step comprises varying the operating conditions of the engine and said exhaust monitoring step further comprises the step of simultaneously monitoring engine speed whereby the speed at which said purge control valve opens can be determined.

9. A method for the automated testing of a vehicle fuel evaporation control system comprising a fuel storage tank, a fuel vapor collection canister and a canister purge valve comprising the steps of:

i) connecting the fuel evaporation control system to a source of inert gas and introducing said inert gas into said system; and ii) running the vehicle engine while monitoring the exhaust of said vehicle for the presence of said inert gas therein.

10. The method of claim 9, wherein said monitoring step comprises varying the operating parameters of said engine and determining the relationship between said parameters and the presence of said inert gas in the exhaust.

* * * * *